US012523191B2

(12) United States Patent
Hirata

(10) Patent No.: US 12,523,191 B2
(45) Date of Patent: Jan. 13, 2026

(54) HYBRID VEHICLE

(71) Applicant: MITSUBISHI JIDOSHA KOGYO KABUSHIKI KAISHA, Tokyo (JP)

(72) Inventor: Taketoshi Hirata, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 68 days.

(21) Appl. No.: 18/721,042

(22) PCT Filed: Feb. 14, 2022

(86) PCT No.: PCT/JP2022/005579
§ 371 (c)(1),
(2) Date: Jun. 17, 2024

(87) PCT Pub. No.: WO2023/152946
PCT Pub. Date: Aug. 17, 2023

(65) Prior Publication Data
US 2025/0084810 A1 Mar. 13, 2025

(51) Int. Cl.
*F02M 26/35* (2016.01)
*B60W 20/00* (2016.01)
*F02M 26/17* (2016.01)

(52) U.S. Cl.
CPC .......... *F02M 26/35* (2016.02); *B60W 20/00* (2013.01); *F02M 26/17* (2016.02)

(58) Field of Classification Search
CPC .... F02M 26/35; F02M 26/2617; B60W 20/00
USPC .......................................................... 701/22
See application file for complete search history.

(56) References Cited

U.S. PATENT DOCUMENTS 9,145,135 B2 * 9/2015 Sugimoto ............. B60W 20/16

FOREIGN PATENT DOCUMENTS

| JP | 2009-264202 A | 11/2009 |
| JP | 2010-18212 A | 1/2010 |
| JP | 2019-123332 A | 7/2019 |

OTHER PUBLICATIONS

International Search Report for International Application No. PCT/JP2022/005579, dated Mar. 22, 2022, with an English translation.
(Continued)

*Primary Examiner* — Andrew Joseph Rudy
(74) *Attorney, Agent, or Firm* — Birch, Stewart, Kolasch & Birch, LLP

(57) ABSTRACT

The disclosed hybrid vehicle (1) includes: an engine (3) mounted in a vehicle (1) and to which an EGR system (2) is applied; a motor (4) having a function of driving the vehicle (1) and a function of performing power regeneration; a battery (5) into which electric power generated by the power regeneration is charged. Further, the hybrid vehicle (1) includes: a generator (6) coupled to the engine (3) and having a function of driving the engine (3) with electric power of the battery (5); and an EGR valve (11) interposed in an EGR passage (10) connecting an intake system (8) and an exhaust system (9) of the engine (3). Furthermore, the hybrid vehicle (1) includes a control unit (13) that performs, in the power regeneration, an idle circulation control that idly drives the engine (3) by the generator (6) while opening the EGR valve (11).

5 Claims, 4 Drawing Sheets

(56) References Cited

OTHER PUBLICATIONS

Written Opinion of the International Searching Authority for International Application No. PCT/JP2022/005579, dated Mar. 22, 2022, with an English translation.

* cited by examiner

HYBRID VEHICLE

TECHNICAL FIELD

The present disclosure relates to a hybrid vehicle including an engine to which an EGR (Exhaust Gas Recirculation) system is applied, a motor, and a generator.

BACKGROUND TECHNIQUE

Conventionally, a known hybrid vehicle capable of performing series traveling causes a motor for traveling to regeneratively operate to obtain regenerative braking force and adjusts a power balance by idly driving an engine by another motor using regenerated power. The hybrid vehicle of this type consumes the regenerated power by idly driving the engine, and thereby can suppress electric power from flowing into a battery while securing the regenerative braking force. Therefore, for example, when a charged rate (SOC, State of Charge) of the battery is close to a full charge or when a charging or discharging is desirably refrained, the battery may be suppressed from rapidly degrading (for example, see Patent Document 1).

PRIOR ART REFERENCE

Patent Document

[Patent Document 1] JP 2019-123332 A

SUMMARY OF INVENTION

Problem to be Solved by Invention

In the hybrid vehicle as described above, idly driving the engine may cause gas containing an engine oil component to enter a cylinder(s) from a crankcase and further to flow out to an exhaust passage. Meanwhile, when the engine is idly driven, a catalytic device on the exhaust passage is sometimes not sufficiently warmed, making it difficult to obtain good purification performance. Therefore, in order to improve environmental performance of the hybrid vehicle, it is desirable to provide countermeasures against such problems.

With the foregoing problems in view, an object of the present disclosure is to provide a hybrid vehicle capable of improving environmental performance by suppressing leakage of an engine oil component caused by idly driving an engine. In addition to this object, it is also regarded as another object of the present disclosure to provide actions and effects which are derived from each configuration described in the following "Embodiment(s) to Carry out Invention" and which conventional technique does not attain.

Means to Solve the Problem

The disclosed hybrid vehicle can be realized as an aspect or an application example disclosed below and solves at least a part of the above problems.

The disclosed hybrid vehicle includes: an engine mounted in a vehicle and to which an EGR system is applied; a motor having a function of driving the vehicle and a function of performing power regeneration; a battery into which electric power generated by the power regeneration is charged; a generator coupled to the engine and having a function of driving the engine with electric power of the battery; an EGR valve interposed in an EGR passage connecting an intake system and an exhaust system of the engine; and a control unit that performs, in the power regeneration, an idle circulation control that idly drives the engine by the generator while opening the EGR valve.

Effects of Invention

According to the disclosed hybrid vehicle, the engine is idly driven by the generator, so that the generator can consume electric power generated by the power regeneration, and thus, the battery can be suppressed from being charged. This makes it possible to secure a sufficient amount of regenerative braking force even when, for example, the battery is close to a fully charged state. In addition, idly driving the engine can cause an engine oil component that may be discharged from a cylinder(s) to recirculate in the EGR passage. Accordingly, the engine oil component can be suppressed from leaking out of the vehicle, and thus, the environmental performance of the hybrid vehicle can be improved.

EMBODIMENT(S) TO CARRY OUT INVENTION

The disclosed hybrid vehicle can be implemented by the following embodiment.

Embodiment(s)

1. Device Configuration

Figure 1:
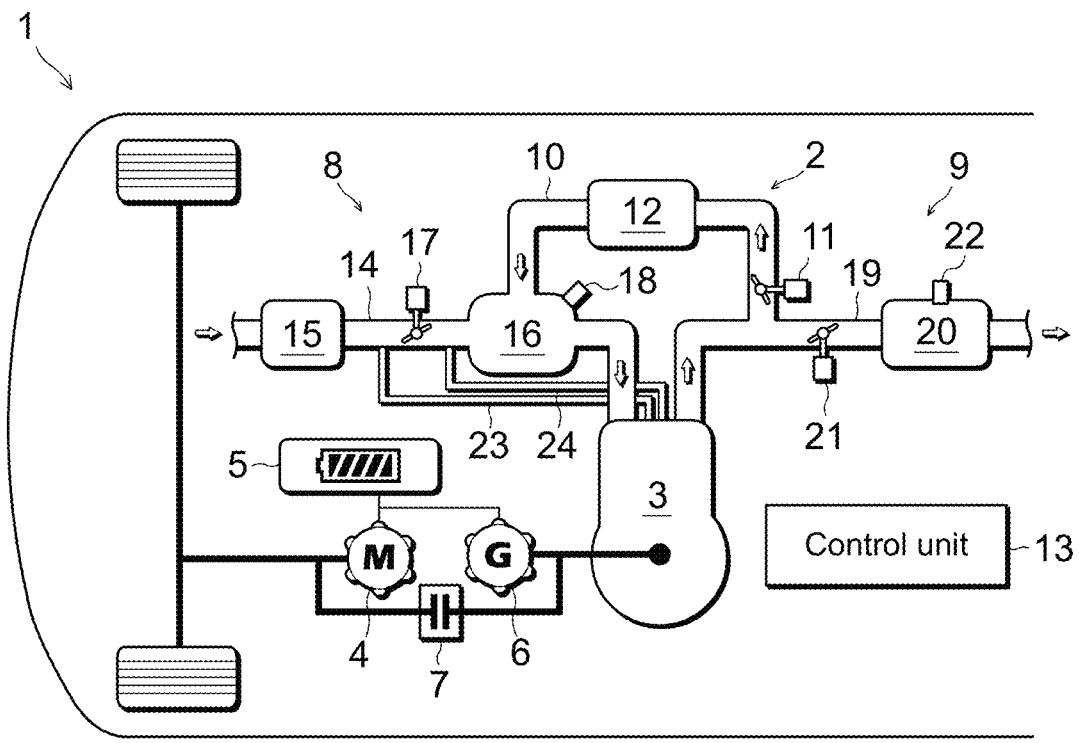
FIG. 1 is a block diagram illustrating a configuration of a hybrid vehicle.

FIG. 1 is a block diagram exemplifying a configuration of a hybrid vehicle 1 as an embodiment. The hybrid vehicle 1 (also simply referred to as the vehicle 1) is a hybrid motor vehicle (HEV, Hybrid Electric Vehicle) or a plug-in hybrid vehicle (PHEV, Plug-in Hybrid Electric Vehicle) equipped with an engine 3 and a motor 4 each serving as a drive source, a generator 6 serving as a power generating device, and a battery 5 serving as a power storing device. The plug-in hybrid vehicle means a hybrid vehicle capable of externally charging the battery 5 or externally supplying power from the battery 5. The plug-in hybrid vehicle is provided with a charging port (inlet) for inserting a charging cable to which electric power from an external charging facility is supplied and/or a plug socket (outlet) for externally supplying power.

The engine 3 is, for example, an internal combustion engine such as a gasoline engine or a diesel engine and an EGR system 2 is applied thereto. To a drive shaft of the engine 3, a generator 6 (dynamo) is coupled, which has a function of driving the engine 3 at least with electric power of the battery 5. The generator 6 of the present embodiment also has a function of generating power by using driving force of the engine 3. The generated power (generated output) of the generator 6 is used for driving the motor 4 and/or charging the battery 5. On a power transmission path that connects the engine 3 and the generator 6, a non-illustrated transmission mechanism may be interposed.

The motor 4 is a motor as well as a generator, which has a function of driving the vehicle 1 by using battery power stored in the battery 5 and/or the generated power of the generator 6 and a function of charging the battery 5 with electric power generated by power regeneration. The battery 5 is, for example, a secondary battery such as a lithium-ion secondary battery or a nickel hydrogen battery. A drive shaft of the motor 4 is connected to drive wheels of the vehicle 1. On a power transmission path that connects the motor 4 and the drive wheels, a non-illustrated transmission mechanism may be interposed.

On a power transmission path that connects the engine 3 and the motor 4, a clutch 7 is interposed. The engine 3 is connected to the drive wheels via the clutch 7 and the motor 4 is disposed closer to the drive wheels than the clutch 7. Further, the generator 6 is connected closer to the engine 3 than the clutch 7. When the clutch 7 is disconnected (released), the engine 3 and the generator 6 are disconnected from the drive wheels and the motor 4 is connected to the drive wheels. Thus, by operating, for example, only the motor 4, so-called EV traveling (motor-only traveling) is realized. In addition to this, by operating the engine 3 to cause the generator 6 to generate electric power, so-called series traveling is realized.

On the other hand, when the clutch 7 is connected (engaged), three of the engine 3, the motor 4, and the generator 6 are connected to the drive wheels. Thus, by operating, for example, only the engine 3, so-called ENG traveling (engine-only traveling) is realized. In addition to this, by driving the motor 4 and the generator 6, so-called parallel traveling is realized. It should be noted that the vehicle 1 may be a hybrid vehicle capable of at least series traveling and other traveling modes (EV traveling, ENG traveling, and parallel traveling) may be omitted as appropriate.

The EGR system 2 applied to the engine 3 will now be described in detail. The EGR system 2 is a system that recirculates, from an exhaust system 9 to an intake system 8, gas discharged from a cylinder(s) of the engine 3, and thereby, improves fuel efficiency and environmental performance. In a typical EGR system 2, the exhaust gas after burnt in the cylinder is controlled to be introduced into the intake system 8. Meanwhile, in the present embodiment, not only the exhaust gas but also gas (gas containing an engine oil component) discharged to the exhaust system 9 due to the idly driving of the engine 3 is controlled to be introduced into the intake system 8. Specific examples of the engine oil component include a mineral oil component, polyalphaolefin, polyolester, silicone, VHVI (Very High Viscosity Index) oil, various modifiers (a friction modifier, a viscosity modifier, a detergent dispersant, an antioxidant, a rust inhibitor, a defoamer, and the like).

The intake system 8 of the engine 3 is provided with an intake passage 14, an air cleaner 15, an intake manifold 16 (intake manifold), a throttle valve 17, and an intake manifold pressure sensor 18. The intake passage 14 is a conduit for allowing fresh air or an air-fuel mixture to flow into the cylinder of the engine 3. The air cleaner 15 is a filtering device (filter) for removing dust and/or dirt contained in the fresh air. The intake manifold 16 is a chamber with a certain volume for storing the fresh air or the air-fuel mixture flowing into the cylinder. When multiple cylinders are provided in the engine 3, multiple flow paths are formed to branch from the intake manifold 16 to be connected to the respective cylinders.

The throttle valve 17 is a flow rate control valve for adjusting an amount of intake air of the engine 3 and is interposed in the intake passage 14 between the air cleaner 15 and the intake manifold 16. The operational state (throttle aperture) of the throttle valve 17 is controlled by a control unit 13 to be described later. The intake manifold pressure sensor 18 is a pressure sensor that detects an internal pressure (intake manifold pressure) of the intake manifold 16. Information on the intake manifold pressure is transmitted to the control unit 13. In the present embodiment, the intake manifold pressure is referred to as a value that represents a pressure of the intake system 8.

The exhaust system 9 of the engine 3 is provided with an exhaust passage 19, an electrically heated catalytic device 20, an exhaust valve 21, and a catalyst temperature sensor 22. The exhaust passage 19 is a conduit for allowing gas to flow from the cylinder of the engine 3 to the outside of the vehicle. The electrically heated catalytic device 20 is a device that integrates a catalytic device for purifying various components contained in gas flowing through the exhaust passage 19 with an electrical heater (heater) for raising the temperature of the catalytic device itself. The operational state of the electrically heated catalytic device 20 is controlled by the control unit 13.

The exhaust valve 21 is a flow rate control valve for adjusting a flow rate of the gas discharged from the cylinder of the engine 3 and is interposed in the exhaust passage 19 upstream of the electrically heated catalytic device 20. The operational state (exhaust valve aperture) of the exhaust valve 21 is controlled by the control unit 13. The catalyst temperature sensor 22 is a temperature sensor that detects a catalyst temperature of the electrically heated catalytic device 20. The catalyst temperature referred herein includes not only the internal temperature of the catalyst but also the temperature upstream of the catalyst and the temperature downstream of the catalyst. The information on the catalyst temperature is transmitted to the control unit 13.

The intake system 8 and the exhaust system 9 are connected by an EGR passage 10. The EGR passage 10 is a conduit for recirculating, from the exhaust system 9 to the intake system 8, the gas discharged from the cylinder of the engine 3. The position at which the EGR passage 10 branches from the exhaust passage 19 is set upstream of the exhaust valve 21. A downstream end of the EGR passage 10 is connected to the intake manifold 16 of the intake system 8. In the EGR passage 10, an EGR valve 11 and a trap catalytic device 12 are interposed. The EGR valve 11 is a flow rate control valve for adjusting a flow rate of gas flowing through the EGR passage 10. The operational state (EGR aperture) of the EGR valve 11 is controlled by the control unit 13.

The trap catalytic device 12 is a catalytic device including a trap layer that absorbs various components contained in the gas discharged from the cylinder of the engine 3. The trap layer may absorb, for example, an unburnt component (HC component, hydrocarbon component) of the fuel, an engine oil component, a NOx component (nitrogen oxide component), an S component (sulfur component), and the like. The various components adsorbed by the trap layer may be purified by effect of a catalyst included in the trap catalytic device 12 and may additionally be purified by the electrically heated catalytic device 20. The positional relationship between the EGR valve 11 and the trap catalytic device 12 is not limited to the relationship illustrated in FIG.

1, and alternatively, the EGR valve 11 may be disposed downstream of (closer to the intake system 8 than) the trap catalytic device 12.

Between a crankcase of the engine 3 and the intake system 8, a first blowby pipe 23 and a second blowby pipe 24 are provided for introducing blowby gas into the intake system 8. Each upstream end (an end close to the engine 3) of the first blowby pipe 23 and the second blowby pipe 24 is connected to an inside of the crankcase (for example, a crank chamber, a valve chamber, or the like). A downstream end of the first blowby pipe 23 is connected to the intake passage 14 upstream of the throttle valve 17. On the other hand, a downstream end of the second blowby pipe 24 is connected to the intake passage 14 downstream of the throttle valve 17.

2. Control Configuration

Each operational state of the engine 3, the motor 4, the battery 5, the generator 6, the clutch 7, the EGR valve 11, the throttle valve 17, the electrically heated catalytic device 20, and the exhaust valve 21 are controlled by the control unit 13. The control unit 13 is a computer (electronic control unit, ECU) for performing at least an idle circulation control in the power regeneration of the motor 4. The control unit 13 includes a processor (arithmetic processing device) and a memory (storage device). The contents of the control (control program) performed by the control unit 13 are stored in the memory and executed by the processor.

The idle circulation control is a control that idly drives the engine 3 by the generator 6 without fuel injection while opening the EGR valve 11 in the power regeneration of the motor 4. The EGR aperture is controlled at least to a state other than a fully closed state and a specific value of the aperture can be set as appropriate. The idle circulation control is suitable when, in a situation where the battery 5 is suppressed or prohibited from being charged, the power regeneration by the motor 4 (generation of the regenerative braking force) is desired.

For example, in a situation where the charged rate of the battery 5 is close to a full charge (the SOC is equal to or greater than a predetermined value), charging of the battery 5 is unavailable, so that a sufficient regeneration braking force may be unobtainable. Alternatively, in a cold environment where the battery temperature is lower than a predetermined value, the battery 5 may be significantly deteriorated by being charged. Performing the idle circulation control under such situations enables the generator 6 to consume the regenerated power, and thus, can secure the regenerative braking force while suppressing or prohibiting the battery 5 from being charged.

Figure 2:
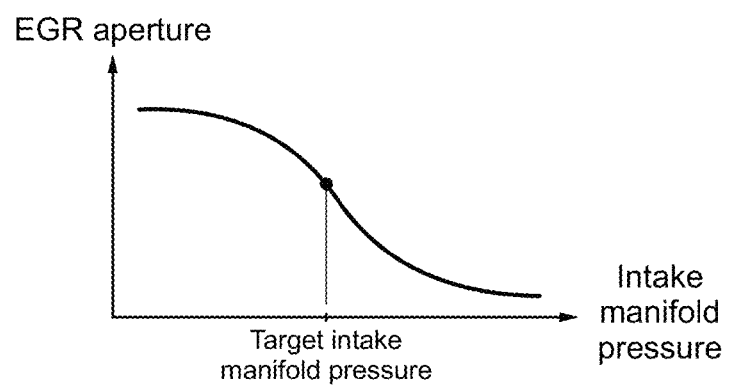
FIG. 2 is a graph exemplifying a relationship between an intake manifold pressure and an EGR aperture.

The EGR aperture in the idle circulation control is preferably set in accordance with the pressure of the intake system 8 of the engine 3. For example, the EGR aperture is set to increase as the pressure of the intake system 8 decreases and is set to decrease (but not fully closed) as the pressure of the intake system 8 increases. The pressure of the intake system 8 is, for example, the intake manifold pressure, a pressure in the cylinder, an internal pressure of the intake passage 14, or the like. FIG. 2 is a graph illustrating a relationship between the intake manifold pressure and the EGR aperture. By using such a characteristic, the EGR aperture can be adjusted so that the intake manifold pressure becomes a predetermined target intake manifold pressure.

In the idle circulation control described above, preferably, the aperture of either the throttle valve 17 or the exhaust valve 21 is controlled to be fully closed, and more preferably, the apertures of both the throttle valve 17 and the exhaust valve 21 are controlled to be fully closed. However, when the target intake manifold pressure can be secured, the throttle valve 17 may be slightly opened. Similarly, when the amount of gas discharged from the cylinder of the engine 3 is small, the exhaust valve 21 may be slightly opened.

Start conditions of the idle circulation control are exemplified below. An essential condition includes only Condition A. Conditions B to F are optional conditions that are not requisite.

Condition A. The power regeneration is being performed (the power regeneration has been started).

Condition B. The charged rate (SOC) of the battery 5 is equal to or higher than a predetermined value.

Condition C. The battery temperature is lower than a predetermined value.

Condition D. The vehicle 1 is decelerating.

Condition E. The brake pedal is being pressed (the brake is on).

Condition F. The accelerator pedal is not being pressed (the accelerator is off).

End conditions of the idle circulation control are exemplified below. An essential condition includes only Condition G. Conditions H to L are optional conditions that are not requisite.

Condition G. The power regeneration is not being performed (the power regeneration has ended).

Condition H. The charged rate (SOC) of the battery 5 is lower than the predetermined value.

Condition I. The battery temperature is equal to or higher than the predetermined value.

Condition J. The vehicle 1 is not decelerating.

Condition K. The brake pedal is not being pressed (the brake is off).

Condition L. The accelerator pedal is being pressed (the accelerator is on).

The control unit 13 of the present embodiment may perform not only the idle circulation control but also an idle non-circulation control. The idle non-circulation control is a control that idly drives the engine 3 by the generator 6 without fuel injection while closing the EGR valve 11. The idle non-circulation control is performed instead of the idle circulation control when, in a situation where the idle circulation control is being performed, the catalyst temperature of the electrically heated catalytic device 20 is equal to or higher than a predetermined temperature (is sufficiently warm, reaching the catalyst activating temperature). As a result, the gas circulated through the EGR passage 10 is introduced into the electrically heated catalytic device 20 and purified. The electrically heated catalytic device 20 is powered (heated) during, for example, the idle circulation control. This powering may be terminated when the idle non-circulation control is started. Alternatively, the powering may be continued so that the catalyst temperature is maintained at the predetermined temperature or higher.

In the above idle non-circulation control, the aperture of the EGR valve 11 is fully closed. In addition, the apertures of the throttle valve 17 and/or the exhaust valve 21 are preferably set larger than those set during the idle circulation control and are more preferably set fully opened. As the apertures of the throttle valve 17 and/or the exhaust valve 21 increase, the time for the gas discharged from the cylinder of the engine 3 to be introduced into the electrically heated catalytic device 20 shortens, so that the gas is immediately purified. The apertures of the throttle valve 17 and/or the exhaust valve 21 may be adjusted in accordance with the catalyst temperature of the electrically heated catalytic device 20. By increasing the apertures of the throttle valve 17 and/or the exhaust valve 21 as the catalyst temperature increases, efficiency of purifying the gas discharged from the cylinder of the engine 3 may be increased.

3. Flowchart

Figure 3:
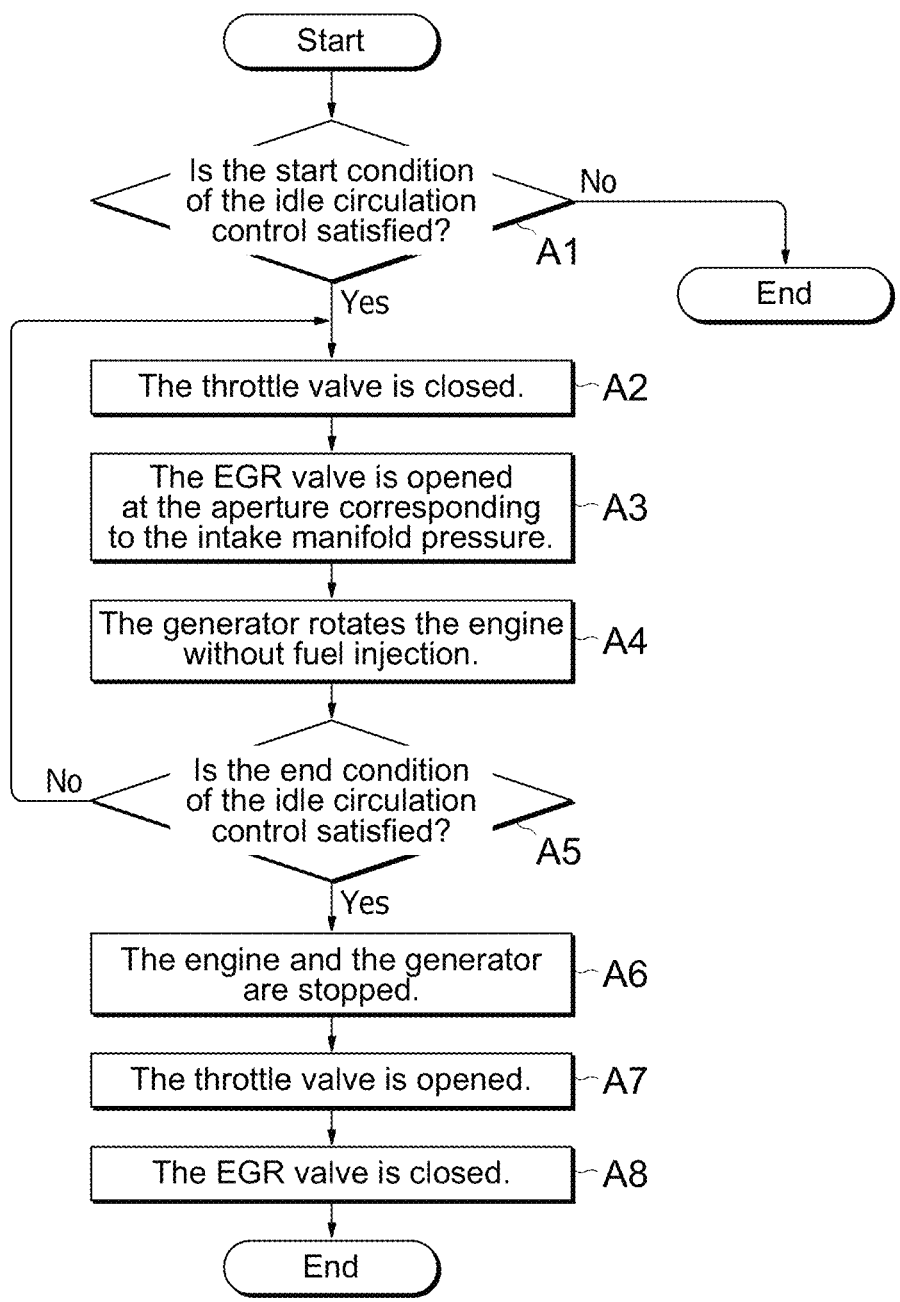
FIG. 3 is a flowchart for explaining a first control example.
Figure 4:
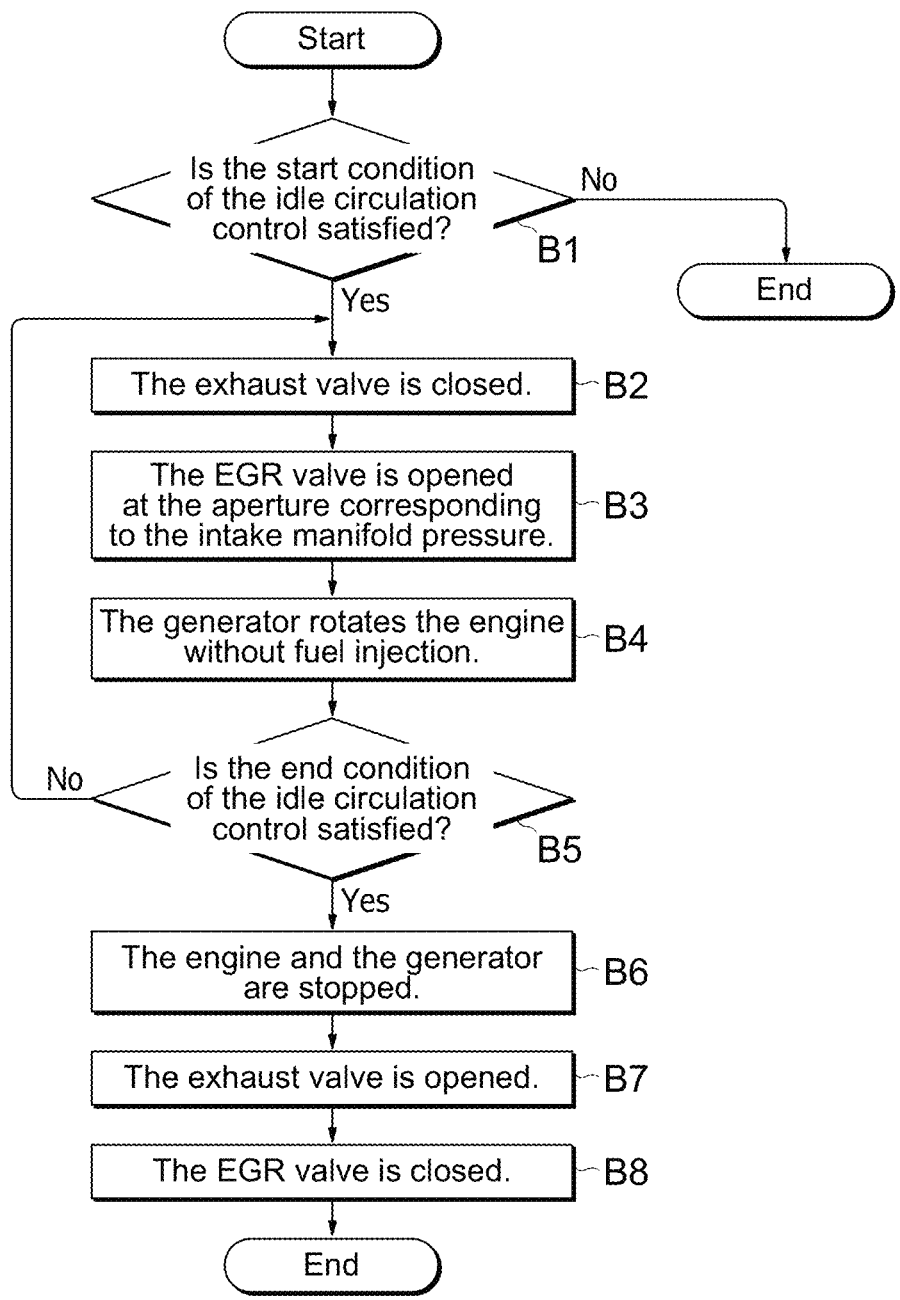
FIG. 4 is a flowchart for explaining a second control example.
Figure 5:
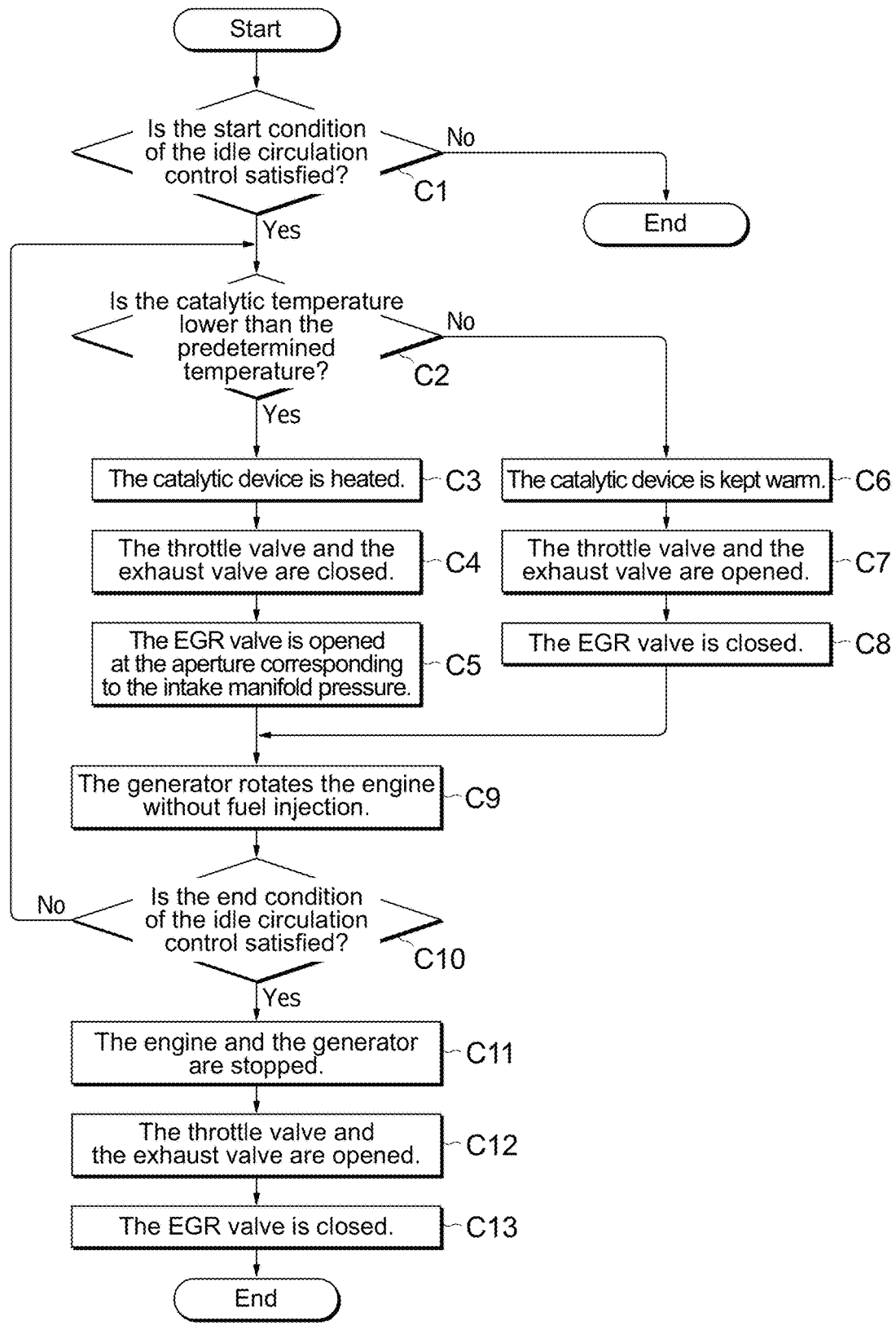
FIG. 5 is a flowchart for explaining a third control example.

FIGS. 3 to 5 are flowchart examples of controls that may be repeatedly executed in a predetermined cycle inside the control unit 13. FIG. 3 is a flowchart according to a first control example. The first control example is a control that performs the idle circulation control while closing the throttle valve 17 and can be executed also in a vehicle 1 equipped with an engine 3 without an exhaust valve 21. In Step A1, it is determined whether or not the start conditions of the idle circulation control are satisfied, which means that it is determined at least whether or not the power regeneration is being performed by the motor 4. When the start conditions are not satisfied, the control in this cycle ends, and when the start conditions are satisfied, the control proceeds to Step A2.

In Step A2, the throttle valve 17 is closed. Further in Step A3, the EGR valve 11 is opened at an aperture corresponding to the intake manifold pressure detected by the intake manifold pressure sensor 18. The aperture of the EGR valve 11 is set, for example, to increase as the intake manifold pressure decreases. In subsequent Step A4, the generator 6 rotates (idly drives, i.e., performs motoring of) the engine 3 without fuel injection. As a result, a part (or all) of electricity from the power regeneration is consumed for driving the generator 6, and thus, the battery 5 is suppressed (or prevented) from being charged. In addition, the gas discharged to the exhaust system 9 due to the idly driving of the engine 3 flows through the EGR passage 10 and circulates from the exhaust system 9 to the intake system 8. Further, the engine oil component contained in the circulating gas is recovered by being absorbed into the trap catalytic device 12.

In Step A5, the end conditions of the idle circulation control are judged, which means that it is determined at least whether or not the power regeneration of the motor 4 has ended. If the end conditions are not satisfied, the control returns to Step A2 and the idle circulation control is continued. On the other hand, when the end conditions are satisfied, the control proceeds to Step A6. In Step A6, the generator 6 stops rotating (idly driving) the engine 3. Further in Step A7, the throttle valve 17 is opened. As a result, the aperture of the throttle valve 17 returns to the state of Step A2 or before Step A2, or becomes a fully opened state. In subsequent Step A8, the EGR valve 11 is closed. As a result, the aperture of the EGR valve 11 returns to the state of Step A3 or before Step A3, or becomes a fully closed state.

FIG. 4 is a flowchart according to a second control example. The second control example is a control that performs the idle circulation control while closing the exhaust valve 21 and can be executed also in a vehicle 1 equipped with an engine 3 without a throttle valve 17. Steps B1, B3 to B6, and B8 in FIG. 4 is the same as Steps A1, A3 to A6, and A8 in FIG. 3, respectively. In Step B2, the exhaust valve 21 is closed, and in Step B7, the exhaust valve 21 is opened. As such, even when the exhaust valve 21 is closed instead of the throttle valve 17, the gas discharged to the exhaust system 9 due to the idly driving of the engine 3 flows through the EGR passage 10 and circulates from the exhaust system 9 to the intake system 8.

FIG. 5 is a flowchart according to a third control example. The third control example is a control that performs the idle circulation control while closing the throttle valve 17 and the exhaust valve 21, and that performs the idle non-circulation control in accordance with the catalyst temperature. In Step C1, it is determined whether or not the start conditions of the idle circulation control are satisfied. When the start conditions are not satisfied, the control in this cycle ends, and when the start conditions are satisfied, the control proceeds to Step C2. In Step C2, it is determined whether or not the catalyst temperature detected by the catalyst temperature sensor 22 is lower than the predetermined temperature.

When the condition of Step C2 is satisfied, it is determined that a start condition of the idle non-circulation control is not satisfied, and the control proceeds to Step C3. In Step C3, the electrically heated catalytic device 20 starts being powered and is heated. In Step C4, the throttle valve 17 and the exhaust valve 21 are closed. Further in Step C5, the EGR valve 11 is opened at an aperture corresponding to the intake manifold pressure detected by the intake manifold pressure sensor 18. In subsequent Step C9, the generator 6 rotates (idly drives, i.e., performs motoring of) the engine 3 without fuel injection.

When the condition of Step C2 is not satisfied, it is determined that the start condition of the idle non-circulation control is satisfied and the control proceeds to Step C6. In Step C6, a control is performed to keep the electrically heated catalytic device 20 warm. For example, the power amount is adjusted, or the powered state is intermittently controlled so as to maintain the catalyst temperature equal to or higher than the predetermined temperature. In Step C7, the throttle valve 17 and the exhaust valve 21 are opened. In Step C8, the EGR valve 11 is closed. In subsequent Step C9, the generator 6 rotates (idly drives, i.e., performs motoring of) the engine 3 without fuel injection.

Then, in Step C10, the end conditions of the idle circulation control are judged. If the end conditions are not satisfied, the control returns to Step C2 and the idle circulation control or the idle non-circulation control is continued. On the other hand, when the end conditions are satisfied, the control proceeds to Step C11. In Step C11, the generator 6 stops rotating (idly driving, i.e., the motoring of) the engine 3. Further in Step C12, the throttle valve 17 and the exhaust valve 21 are opened. In subsequent Step C13, the EGR valve 11 is closed. It should be noted that, if the idle non-circulation control has been performed, the apertures of the EGR valve 11, the throttle valve 17, and the exhaust valve 21 may remain unchanged and Steps C12, C13 may be skipped.

4. Effects (1) The above hybrid vehicle 1 includes the engine 3 mounted in the vehicle 1 and to which the EGR system 2 is applied, the motor 4 having a function of driving the vehicle 1 and a function of performing the power regeneration, and the battery 5 into which electric power generated by the power regeneration is charged. Further, the above hybrid vehicle 1 includes the generator 6 coupled to the engine 3 and having a function of driving the engine 3 with electric power of the battery 5, the EGR valve 11 interposed in the EGR passage 10 connecting the intake system 8 and the exhaust system 9 of the engine 3, and the control unit 13. The control unit 13 performs, in the power regeneration of the motor 4, the idle circulation control that idly drives the engine 3 by the generator 6 while opening the EGR valve 11.

As such, the engine 3 is idly driven by the generator 6, so that the generator 6 can consume the electric power generated by the power regeneration, and thus, the battery 5 can be suppressed from being charged. This makes it possible to secure a sufficient amount of regenerative braking force even when, for example, the battery 5 is close to a fully charged state. In addition, idly driving the engine 3 can cause the engine oil component that may be discharged from the cylinder to recirculate in the EGR passage 10. Accordingly, the gas containing the engine oil component can continue circulating, and by suppressing the gas from leaking out of the vehicle, the environmental performance of the hybrid vehicle 1 can be improved.

(2) In the idle circulation control, the above control unit 13 may perform a control to increase the aperture of the EGR valve 11 as the pressure of the intake system decreases. According to such a control, the engine negative pressure (negative pressure of the intake system 8) can be optimized and the gas containing the engine oil component can continue circulating at high efficiency. Therefore, the environmental performance of the hybrid vehicle 1 can be improved.

(3) The above hybrid vehicle 1 includes the trap catalytic device 12 interposed in the EGR passage 10. This makes it possible to recover the engine oil component contained in the gas discharged from the cylinder of the engine 3. Therefore, the environmental performance of the hybrid vehicle 1 can be improved. A part of the recovered engine oil component can be purified by the effect of a catalyst included in the trap catalytic device 12. Further, after the end of the idle circulation control or during the idle non-circulation control, it can be purified by the electrically heated catalytic device 20.

(4) In the idle circulation control, as illustrated in FIGS. 3 and 5, the throttle valve 17 may be closed. Accordingly, the fresh air can be more reliably prevented from flowing into the cylinder during the idle circulation control, which enables stable circulation of the gas containing the engine oil component. Therefore, the gas containing the engine oil component becomes less likely to leak out of the vehicle, and the environmental performance of the hybrid vehicle 1 can be improved. In addition, the idle circulation control can be performed also in the vehicle 1 equipped with the engine 3 without the exhaust valve 21.

(5) In the idle circulation control, as illustrated in FIGS. 4 and 5, the exhaust valve 21 may be closed. Accordingly, the gas containing the engine oil component can be more reliably prevented from leaking out of the vehicle, which enables stable circulation of the gas containing the engine oil component. Therefore, the environmental performance of the hybrid vehicle 1 can be improved. In addition, the idle circulation control can be performed also in the vehicle 1 equipped with the engine 3 without the throttle valve 17.

(6) In the idle circulation control, when the temperature of the electrically heated catalytic device 20 is lower than the predetermined temperature, the above control unit 13 heats the electrically heated catalytic device 20. Further, when the temperature of the electrically heated catalytic device 20 becomes equal to or higher than the predetermined temperature, the idle non-circulation control is performed, which idly drives the engine 3 by the generator 6 while closing the EGR valve 11. As such, when the electrically heated catalytic device 20 is not yet warmed, by performing the idle circulation control, it is possible to cause the gas containing the engine oil component to continue circulating. Then, when the electrically heated catalytic device 20 is warmed, by performing the idle non-circulation control, it is possible to purify the gas containing the engine oil component.

5. Miscellaneous

The above embodiment is merely illustrative and is not intended to exclude the application of various modifications and techniques that are not explicitly described in the present embodiment. Each configuration of the present embodiment can be variously modified and implemented without departing from the gist thereof. Further, each configuration of the present embodiment can be selected as necessary or can be combined as appropriate. For example, in the above embodiment, the trap catalytic device 12 is interposed in the EGR passage 10, but the trap catalytic device 12 can be omitted. At least, in the power regeneration, by idly driving the engine 3 by the generator 6 while opening the EGR valve 11, it is possible to cause the gas containing the engine oil component to circulate, and to obtain the same actions and effects as those in the above embodiment.

The above embodiment illustrates the engine 3 in which the throttle valve 17 is interposed in the intake system 8 and the exhaust valve 21 is interposed in the exhaust system 9, but both the throttle valve 17 and the exhaust valve 21 can be omitted. At least by performing the idle circulation control while opening the EGR valve 11, it is possible to cause the gas containing the engine oil component to circulate, and to obtain the same actions and effects as those of the above embodiment.

The above embodiment illustrates the engine 3 in which the electrically heated catalytic device 20 is interposed in the exhaust passage 19, but the electrically heated catalytic device 20 can be replaced with a catalytic device that is not electrically heated or can be omitted. If a catalytic device that is not electrically heated is applied, the temperature of the catalytic device may be increased by utilizing waste heat of the motor 4 and/or the generator 6, or the temperature of the catalytic device may be increased by firing of the engine 3.

The above embodiment illustrates the relationship between the intake manifold pressure and the EGR aperture as illustrated in FIG. 2, but such a relationship is merely an example for explaining the operation of the embodiment and a correlation relationship different from this may be defined. Further, instead of the intake manifold pressure, the EGR aperture may be set using the pressure in the cylinder or the internal pressure of the intake passage 14. Setting the EGR aperture based on the pressure of the intake system 8 can facilitate optimization of the engine negative pressure.

INDUSTRIAL APPLICABILITY

The present disclosure is applicable to the industries of manufacturing hybrid vehicles.

DESCRIPTION OF REFERENCE SIGN

1 Vehicle (hybrid vehicle)
2 EGR system
3 Engine
4 Motor
5 Battery
6 Generator
7 Clutch
8 Intake system
9 Exhaust system
10 EGR passage
11 EGR valve
12 Trap catalytic device
13 Control unit
14 Intake passage
15 Air cleaner
16 Intake manifold
17 Throttle valve
18 Intake manifold pressure sensor
19 Exhaust passage
20 Electrically heated catalytic device
21 Exhaust valve
22 Catalyst temperature sensor
23 First blowby pipe
24 Second blowby pipe

The invention claimed is:

1. A hybrid vehicle comprising:
an engine mounted in a vehicle and to which an exhaust gas recirculation (EGR) system is applied;
a motor having a function of driving the vehicle and a function of performing power regeneration;
a battery into which electric power generated by the power regeneration is charged;
a generator coupled to the engine and having a function of driving the engine with electric power of the battery;
an EGR valve interposed in an EGR passage connecting an intake system and an exhaust system of the engine; and
a control unit that performs, in the power regeneration, an idle circulation control that idly drives the engine by the generator while opening the EGR valve, wherein
the control unit increases, in the idle circulation control, an aperture of the EGR valve as a pressure of the intake system decreases.

2. The hybrid vehicle according to claim 1, comprising a trap catalytic device interposed in the EGR passage.

3. The hybrid vehicle according to claim 1, comprising a throttle valve interposed in an intake passage upstream of a position at which the EGR passage is connected in the intake system, wherein
the control unit closes the throttle valve in the idle circulation control.

4. The hybrid vehicle according to claim 1, comprising an exhaust valve interposed in an exhaust passage downstream of a position at which the EGR passage is connected in the exhaust system, wherein
the control unit closes the exhaust valve in the idle circulation control.

5. The hybrid vehicle according to claim 1, comprising an electrically heated catalytic device disposed in an exhaust passage downstream of a position at which the EGR passage is connected in the exhaust system, wherein
when a temperature of the electrically heated catalytic device is lower than a predetermined temperature, the control unit performs the idle circulation control while heating the electrically heated catalytic device, and
when the temperature becomes equal to or higher than the predetermined temperature, the control unit performs, instead of the idle circulation control, an idle non-circulation control that idly drives the engine by the generator while closing the EGR valve.

* * * * *